Nov. 10, 1959  J. D. MITCHELL ET AL  2,911,849
REVERSIBLE DRIVE MECHANISM

Filed April 16, 1958                    3 Sheets-Sheet 1

John Donald Mitchell
Leonard F. Kamp
INVENTORS

BY R. Frank Smith
Robert W. Hampton
ATTORNEYS

John Donald Mitchell
Leonard F. Kamp
INVENTORS

John Donald Mitchell
Leonard F. Kamp
INVENTORS

United States Patent Office 2,911,849
Patented Nov. 10, 1959

2,911,849

REVERSIBLE DRIVE MECHANISM

John D. Mitchell and Leonard F. Kamp, Rochester, N.Y., assignors to Eastman Kodak Company, Rochester, N.Y., a corporation of New Jersey Application April 16, 1958, Serial No. 728,880

4 Claims. (Cl. 74—472)

The present invention relates to motion picture projectors and more particularly to reversible drive mechanism for such projectors.

In the less expensive motion picture projectors it is common practice to supply motive power to only one film reel shaft and to employ that shaft both for driving the film in a forward direction through the projection gate and for subsequently rewinding the film. The energization of only one shaft requires film reels to be interchanged for a rewinding operation but permits considerable economy in manufacturing the projector.

Accordingly, a principal object of the present invention is to provide a simple, reliable and inexpensive mechanism for reversing the direction of rotation of a shaft.

A further object is to provide a reversible drive mechanism by means of which a shaft is positively driven in one direction and is yieldably driven in the opposite direction.

Other objects of the invention will appear from the following description, reference being made to the accompanying drawings, wherein.

Figure 1:
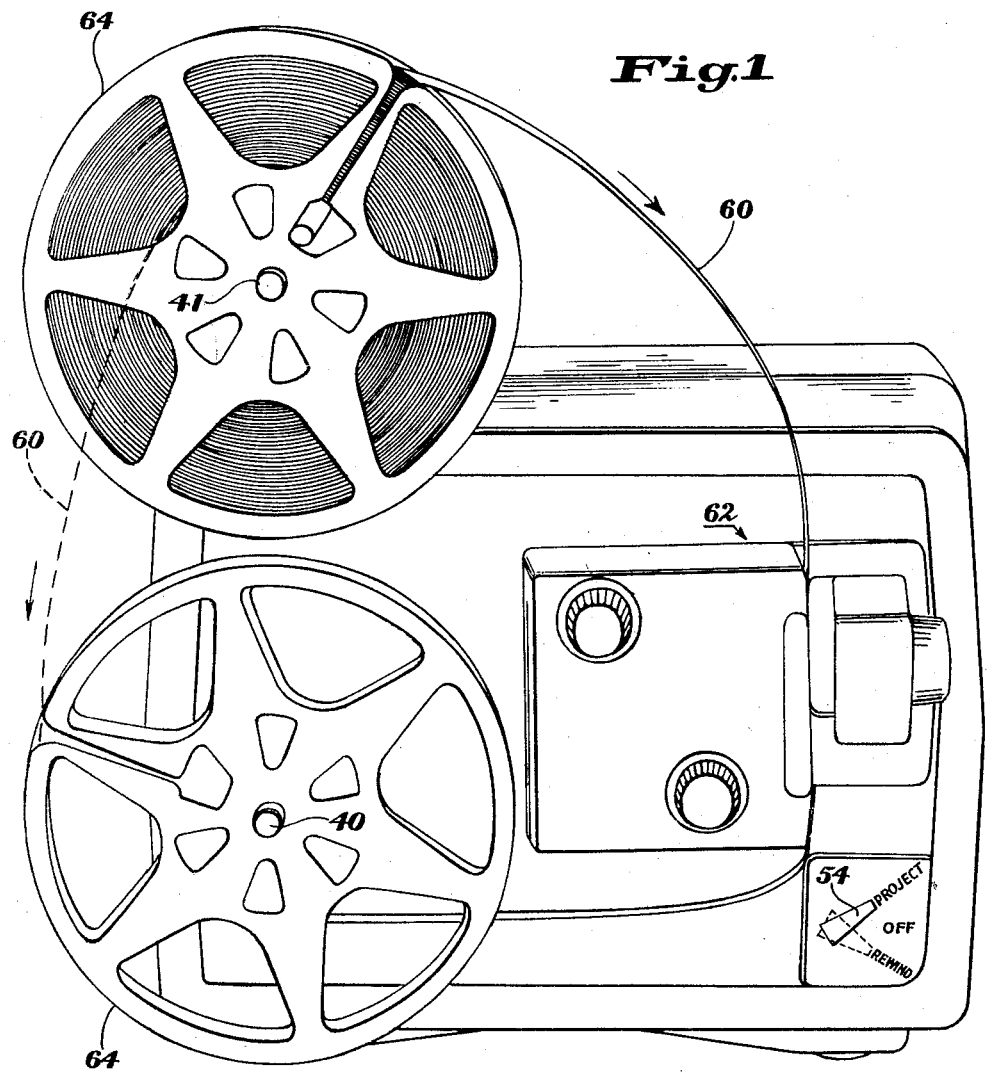
Fig. 1 is a side view of the projector in which the present invention is used.

Referring to Fig. 1, the projector has a pair of reel shafts 40 and 41 adapted to support film reels such as 64. Driving power is supplied only to shaft 40 during both projection and rewind. A drive selector knob 54 controls the direction of rotation of shaft 40 as hereinafter described. For projection, a full reel is placed on shaft 41, threaded through the projection gate 62 and secured to an empty reel on shaft 40. The path of the film is shown in solid lines in Fig. 1. Knob 54 is turned to the Project position, shown in solid lines and thereby causes shaft 40 to be driven clockwise for winding the film on the driven reel. When the film has been projected, the reels are interchanged to again place the full reel on shaft 41, and the film 60 is secured directly to the empty reel on shaft 40 through the path shown in Fig. 1 by a broken line. Knob 54 is turned to its Rewind position, also shown in broken lines, and shaft 40 is driven counterclockwise to rewind the film onto the driven reel.

Figure 2:
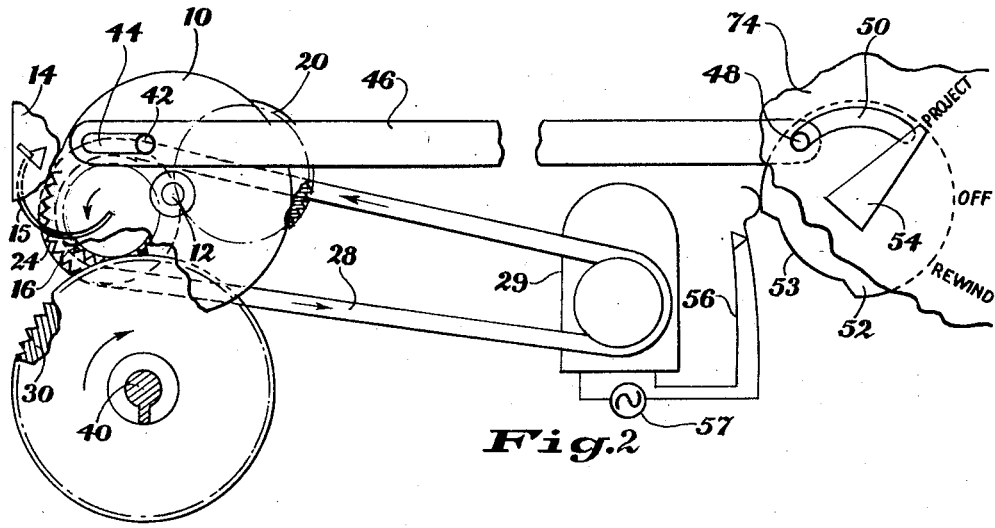
Fig. 2 is a side view of the reversing mechanism with the drive selector in the Project position.
Figure 7:
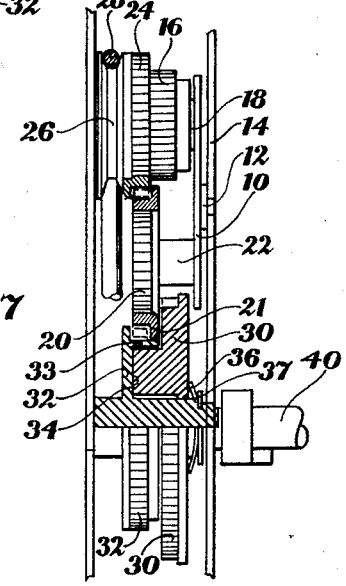
Fig. 7 is a left end view of the reversing mechanism, partly broken away, showing the reverse drive train.

Referring to Figs. 2 and 7, the reversing mechanism comprises a disk-shaped carrier 10 which is mounted by a stub shaft 12 on a frame member 14 for rocking motion relative to the frame member. A toggle spring 15 extends between the frame member 14 and carrier 10 and maintains the carrier in either of two angular positions. A pinion gear 16 and an idler gear 20 are rotatively mounted on carrier 10 by respective stub shafts 18 and 22. A gear 24, integral with pinion gear 16, is in constant mesh with idler gear 20. A pulley 26, integral with gears 16 and 24, receives driving power through a belt or cord 28 from any suitable source of power, such as an electric motor 29. Regardless of the angular position of carrier 10, belt 28 remains in driving engagement with pulley 26.

Figure 3:
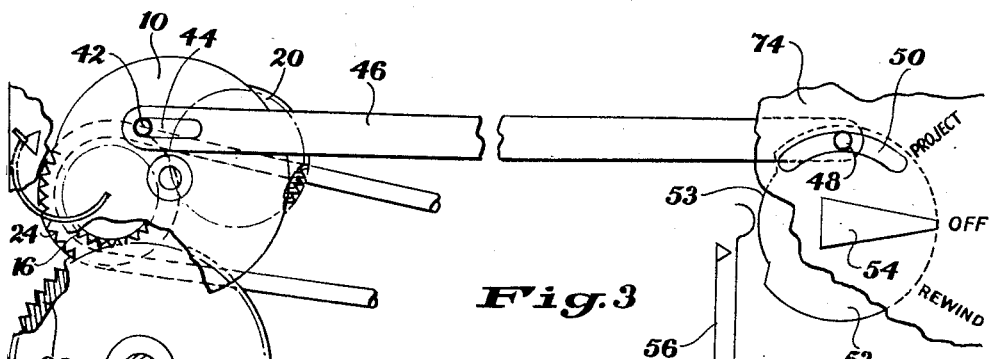
Fig. 3 is a side view of the reversing mechanism when the drive selector has been moved from the Project position to the Off position.
Figure 4:
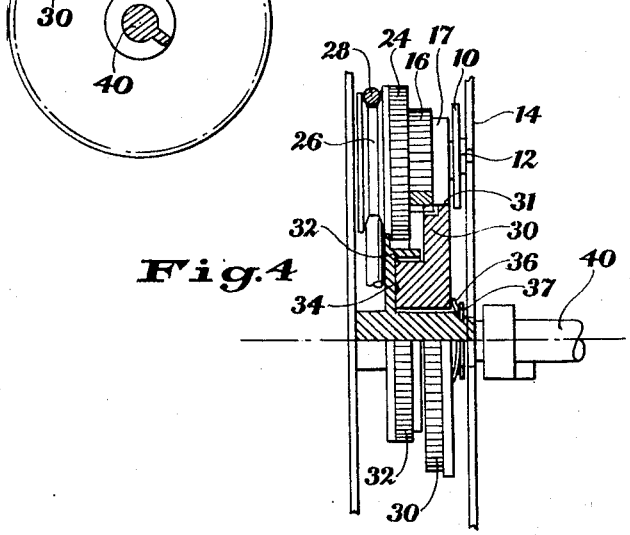
Fig. 4 is a left end view of the reversing mechanism, partly broken away, showing the forward drive train.

When carrier 10 is in its counterclockwise position, i.e., the position shown in Figs. 2 and 3, pinion gear 16 engages a gear 30 (see also Fig. 4), which is loosely mounted on the hub of a gear 32, the latter being rigidly secured to the film reel shaft 40. Gear 30 is maintained in frictional engagement with gear 32 over an annular surface 34 by means of a spring member 36 mounted between the hub of gear 32 and a retaining clip 37. Gears 30 and 32 constitute the driving and driven members, respectively, of a friction clutch through which shaft 40 is rotated when carrier 10 is in the position shown in Fig. 2. The direction of rotation of shaft 40 indicated in Fig. 2 is the "forward" direction for driving the film through the projection gate, at which time a yieldable drive is desired in order to maintain a constant winding speed while the diameter of the wound film increases.

Figure 5:
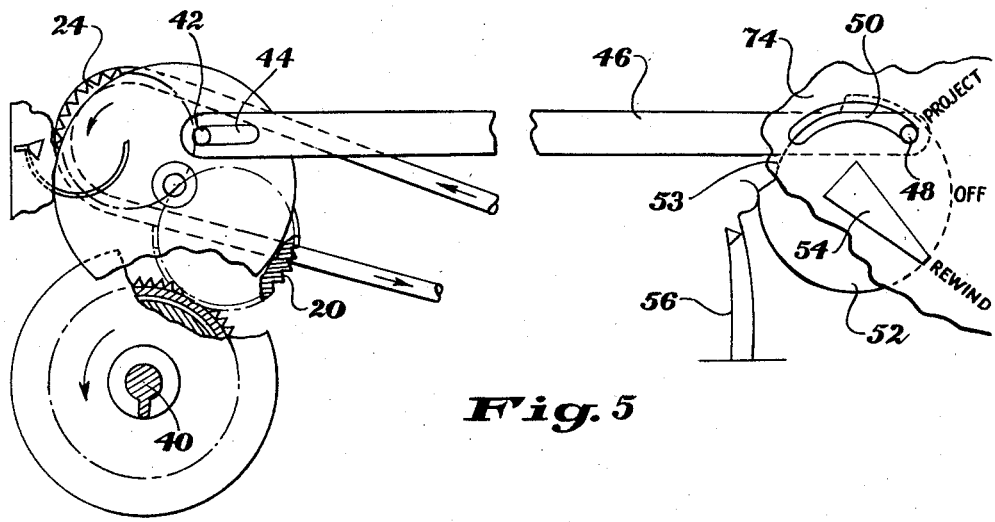
Fig. 5 is a side view of the reversing mechanism with the drive selector in the Rewind position.
Figure 6:
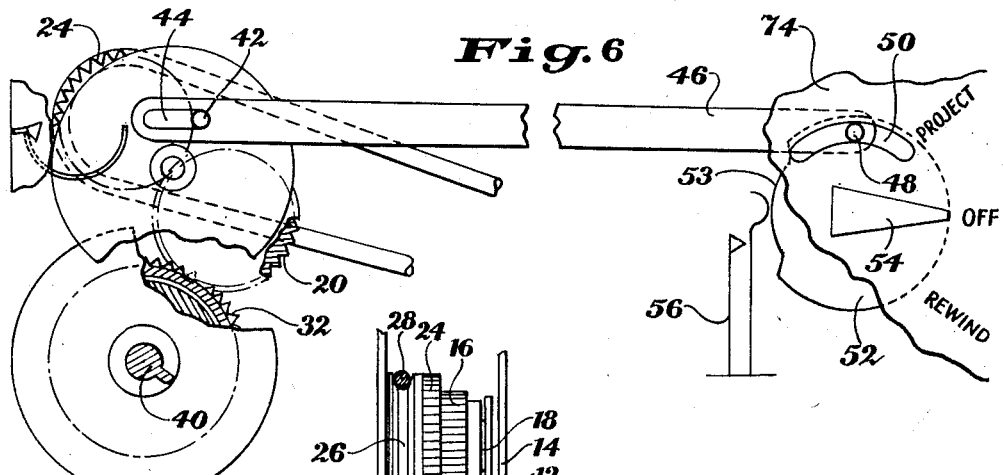
Fig. 6 is a side view of the reversing mechanism when the drive selector has been moved from the Rewind position to the Off position.

Since the film is not passed through the projection gate during the rewinding operation, a constant film speed is not required and shaft 40 need not be yieldably driven. The reverse drive of shaft 40 is achieved by rocking carrier 10 to its clockwise position, as shown in Figs. 5 and 6. In this position of the drive train, gears 16 and 30 are disengaged and idler gear 20 (see also Fig. 7) engages gear 32; therefore, the drive train extends from pulley 26 through gears 24, 20 and 32 to shaft 40. The interposition of idler gear 20 reverses the direction of rotation of shaft 40, as indicated in Fig. 5. The disengaging of gears 16 and 30 and the engaging of gears 20 and 32 bypasses the driving member 30 of the friction clutch and causes shaft 40 to be driven directly through the driven member 32 of the clutch; therefore, no yieldable driving connection is present in the reverse train.

In the preferred construction of the drive train, the lands of gears 16, 20, 30 and 32 (Figs. 2 and 5) are made quite thin to minimize the possibility of the gears not meshing when they are shifted. Each of these four gears also is provided with a respective rolling cylinder 17, 21, 31 and 33 (Figs. 4 and 7), integral therewith. The peripheries of the rolling cylinders are located near the pitch lines of their associated gears and limit the depth of mesh of the gears to thereby properly locate the shiftable gears 16 and 20 relative to the fixed gears 30 and 32. The rolling contact between the gears also has been found to minimize noise and wear.

The mechanism for shifting carrier 10 from one of its angular positions to the other includes a stud 42 (Fig. 2) located eccentrically on carrier 10 and cooperating with a slot 44 on one end of a shifting lever 46. The other end of lever 46 carries a stud 48 which cooperates with an arcuate slot 50 in frame member 14. Stud 48 also is secured to a drive selector cam 52 which is rotatably mounted on frame member 14. Cam 52 carries the previously mentioned manually rotatable indicating knob 54, which cooperates with three reference marks on the machine cover 74, the marks being identified as Project, Off and Rewind. When knob 54 is in the Project position, shown in Fig. 2, lever 46 and stud 40 are in their leftmost positions and carrier 10 is in its counterclockwise position to engage gear 16 with gear 30. When knob 54 is turned from the Project position to the Off position, as shown in Fig. 3, lever 46 is moved to the right, but this movement is equal to or slightly less than the length of slot 44. Therefore, stud 42 is not moved by the shifting lever and carrier 10 remains in its counterclockwise position with gears 16 and 30 engaged. As knob 54 is then turned to its Rewind position, lever 46 moves further to the right, carrying stud 42 with it and rocking carrier 10 to its clockwise position for disengaging gears 16 and 30 and engaging gears 20 and 32, thereby reversing the drive direction of shaft 40. Subsequent turning of knob 54 back to its Off position leaves carrier 10 in its clockwise position due to the movement of slot 44 relative to stud 42.

A motor switch 56, in series between the drive motor 29 (Fig. 2) and a power source 57, may be operated by the drive selector cam 52 for energizing the drive motor only when the drive selector is in its Project and Rewind positions. The periphery of cam 52 cooperates with the blades of switch 56 to maintain that switch closed when the cam has been moved by knob 54 to either of its two extreme angular positions, as shown in Figs. 2 and 5. However, when knob 54 is turned to its Off position, it moves a cutout portion 53 of the periphery of cam 52 opposite the blades of switch 56 (Figs. 3 and 6) and permits the switch to open, thereby stopping the projector motor in preparation for shifting the gears in the drive train.

The invention has been described in detail with particular reference to a preferred embodiment thereof, but it will be understood that variations and modifications can be effected within the spirit and scope of the invention as described hereinabove and as defined in the appended claims.

We claim:

1. In a motion picture projector having a motor and a driven shaft adapted to support a film reel, reversible drive means interrelating said motor and shaft and comprising: a carrier adapted to be rocked to either of two angular positions; detent means connected to said carrier for yieldably retaining the latter in either of said positions; a pinion gear rotatably supported on said carrier; an idler gear rotatably supported on said carrier; a driving connection between the motor and said pinion gear; a driving connection between said pinion gear and said idler gear; a friction clutch including a driving member and a driven member, said driving member being in frictional driving engagement with said driven member and said driven member being in rigid driving engagement with said driven shaft; a drive selector for rocking said carrier to a first one of its two positions to establish a driving connection between said pinion gear and the driving member of said friction clutch; and means including said drive selector for rocking said carrier to its second position to interrupt said last named driving connection and to establish a driving connection between said idler gear and the driven member of said clutch.

2. The motion picture projector defined in claim 1, wherein said drive selector includes: a lever having a lost motion connection with said carrier; and a manually adjustable selector knob rigidly connected to said lever.

3. The motion picture projector defined in claim 2, wherein said drive selector knob includes a cam-shaped surface integral therewith and adapted to be moved during adjustment of said knob, with: a source of electrical power for said motor; a switch in series between said source and said motor and disposed in cooperative relation with said cam-shaped surface for maintaining said switch open when said selector knob is in a first adjusted position and maintaining said switch closed when said knob is in a second adjusted position.

4. In a motion picture projector having a source of motive power and a driven shaft adapted to support a film reel, reversible drive means comprising: a slip clutch having a driving member and a driven member with a driving connection between said driven member and said driven shaft; drive means in constant driven relation with said source of motive power; selectively operable means for establishing a driving connection between said drive means and the driving member of said clutch; drive reversing means; and means including said selectively operable means for reversing the direction of said shaft by disrupting said last named driving connection and by establishing a driving connection from said drive means through said drive reversing means to the driven member of said clutch.

References Cited in the file of this patent

UNITED STATES PATENTS

| | | |
|---|---|---|
| 2,189,558 | Baxter | Feb. 6, 1940 |
| 2,464,135 | Hutchinson | Mar. 8, 1949 |
| 2,717,055 | Heimger | Sept. 6, 1955 |